United States Patent
Mackie et al.

(10) Patent No.: US 9,434,467 B2
(45) Date of Patent: Sep. 6, 2016

(54) CATCHER RING ARRANGEMENT

(71) Applicant: ROLLS-ROYCE PLC, London (GB)

(72) Inventors: Kenneth John Mackie, Derby (GB); Kenneth Franklin Udall, Ilkeston (GB)

(73) Assignee: ROLLS-ROYCE plc, London (GB)

( * ) Notice: Subject to any disclaimer, the term of this patent is extended or adjusted under 35 U.S.C. 154(b) by 573 days.

(21) Appl. No.: 13/914,961

(22) Filed: Jun. 11, 2013

(65) Prior Publication Data

US 2013/0343896 A1   Dec. 26, 2013

(30) Foreign Application Priority Data

Jun. 22, 2012   (GB) .................................. 1211133.2

(51) Int. Cl.
*B64C 11/08* (2006.01)
*B64C 11/06* (2006.01)
*F01D 5/30* (2006.01)
*B64D 27/00* (2006.01)

(52) U.S. Cl.
CPC ................ *B64C 11/08* (2013.01); *B64C 11/06* (2013.01); *B64D 2027/005* (2013.01); *F01D 5/3023* (2013.01); *Y02T 50/66* (2013.01)

(58) Field of Classification Search
CPC ....... B64C 11/08; B64C 11/06; B64C 11/04; B64D 2027/005; F01D 21/045; F01D 5/30; F01D 5/3023; Y02T 50/66
See application file for complete search history.

(56) References Cited

U.S. PATENT DOCUMENTS

| | | | | |
|---|---|---|---|---|
| 4,762,466 | A * | 8/1988 | Bouiller | B64C 11/06 416/205 |
| 8,985,946 | B2 * | 3/2015 | Udall | F01D 5/30 415/229 |
| 9,011,098 | B2 * | 4/2015 | Lafont | B64C 11/06 416/207 |
| 9,145,776 | B2 * | 9/2015 | Mackie | F01D 5/30 |
| 2010/0215499 | A1 * | 8/2010 | Lafont | B64C 11/06 416/204 A |
| 2011/0176924 | A1 * | 7/2011 | Gallet | B64C 11/04 416/220 R |
| 2011/0217172 | A1 * | 9/2011 | Fabre | B64C 11/06 416/147 |
| 2012/0070287 | A1 * | 3/2012 | Lafont | B64C 11/06 416/120 |
| 2012/0321470 | A1 * | 12/2012 | Udall | F01D 5/30 416/147 |
| 2012/0321476 | A1 * | 12/2012 | Mackie | F01D 5/30 416/220 R |

FOREIGN PATENT DOCUMENTS

FR   2 943 984        10/2010
FR   2 943 985 A1    10/2010
(Continued)

OTHER PUBLICATIONS

Search Report issued in European Patent Application No. 13 17 1358 dated Jun. 11, 2014.
(Continued)

*Primary Examiner* — Richard Edgar
*Assistant Examiner* — Eldon Brockman
(74) *Attorney, Agent, or Firm* — Oliff PLC

(57) ABSTRACT

This invention relates to a blade assembly comprising: a hub which is rotatable about an axis; at least one blade having an aerofoil portion and a root, wherein the root is coupled to the hub using a primary retention device which prevents radial separation of the root and hub in normal use; and, a secondary retention device which comprises an annular catcher having a restriction through which the root portion cannot radially pass, the restriction being located radially outwardly and radially spaced from the root part during use.

13 Claims, 3 Drawing Sheets

(56) References Cited

FOREIGN PATENT DOCUMENTS

| FR | 2 957 051 A1 | 9/2011 |
|----|----|----|
| GB | 2474561 A | 4/2011 |
| WO | WO 2011/000943 A1 | 1/2011 |
| WO | WO 2011/015475 A1 | 2/2011 |

OTHER PUBLICATIONS

Search Report issued in British Application No. 1211133.2 dated Oct. 22, 2012.

* cited by examiner

CATCHER RING ARRANGEMENT

TECHNICAL FIELD OF INVENTION

This invention relates to a retention device for a rotating blade. In particular, the invention relates to a secondary retention device which provides a failsafe mechanism to help prevent release of a blade in the event of a failure of a primary retention device.

BACKGROUND OF INVENTION

It is known to use a retention device on rotating blades, for example, on a propeller of an aircraft engine, to help prevent radial separation of the blades from the hub on which they are mounted. It is also known to use a secondary retention device which acts to prevent the radial separation of the blade and hub in the event of a failure of the primary retention device.

One known propeller assembly which utilises such a secondary retention device is shown in FIG. 1. The propeller assembly 10 comprises a hub 12 and a blade 14 having an aerofoil 16 and root 18. The blade 14 is configured to rotate about axis 19 with hub 12 on bearings (not shown) so as to provide a thrust in the direction indicated by arrow 21. Bearings 24, 25 are provided such that the blade can be rotated about its longitudinal axis so as to provide a pitch control system. During manufacture of the propeller assembly 10, the root 18 is inserted into the hub 14 via an aperture 20 in the outer surface 22 of the hub 14 and the bearings 24 inserted between respective radially opposing faces 26, 28 of the hub 14 and root 18. The bearings 24 provide the rotational support required of the blade 14 and also act to prevent radial separation of the blade 14 and hub 12 during use. In this way, the bearings 24 act as a primary retention device.

The secondary retention device in the embodiment shown in FIG. 1 is a circular wire 32 which is fed into a channel formed from corresponding grooves in the facing surfaces of the hub 12 and the root 18. In the event of bearing failure, radial separation of the blade 14 and hub 12 is prevented by the wire.

Although the use of the wire 32 as a secondary retention device can be adequate, it relies on being correctly installed which requires a skilled operator and excessive amounts of time.

Further, because the wire 32 is neither an integral part of the hub 12 nor the blade 14, it is subjected to relative movement between these components which can lead to vibration and wear problems. A further difficulty with this system arises due to the concealed location of the wire which makes inspection more troublesome.

The present invention seeks to overcome some of the problems with known prior art.

STATEMENTS OF INVENTION

In one aspect, the present invention provides a blade assembly comprising: a hub which is rotatable about an axis; at least one blade having an aerofoil portion and a root, wherein the root is coupled to the hub using a primary retention device which prevents radial separation of the root and hub in normal use; and, a secondary retention device which comprises an annular catcher having a restriction through which the root portion cannot radially pass, the restriction being located radially outwardly and radially spaced from the root part during use.

Providing a restriction in this way allows retention device to be provided which is unloaded in normal use.

The restriction can be an aperture through which a portion of the blade passes, in use. The aperture may be axisymmetric. The aperture may be generally circular.

The annular catcher may comprise at least two segments which abut one another along a parting line, the parting line passing through at least one aperture. The parting line may pass through each aperture. The parting line may lie on the circumferential midline of the annular catcher.

The two annular segments are attached via a plurality of fasteners. The fasteners may be bolts.

The annular catcher may be radially located around the hub by three or more locating assemblies. The locating assemblies may include at least one two part connector having male and female portions. At least one part of the locator assembly may be local to the restriction.

The hub may be nested within at least a portion of the annular catcher. The annular catcher may be fixedly attached to the hub via a flanged portion.

The annular catcher may be generally polygonal. The apexes of the polygon may each be located at a restriction.

The annular catcher includes two side rails which are axially spaced relative the axis.

The blade assembly may further comprise a web portion which extends between side rails. The restriction may be located between the side rails. The side rails may have a substantially constant radial thickness. The axial width of the annular catcher may vary around the circumference of the catcher. The axial width may be at a minimum at the midpoint between each restriction. Either or both of the radially inner and outer surfaces of the catcher may be concave.

DESCRIPTION OF DRAWINGS

Embodiments of the invention will now be described with the aid of the following drawings of which.

DETAILED DESCRIPTION OF INVENTION

Figure 1:
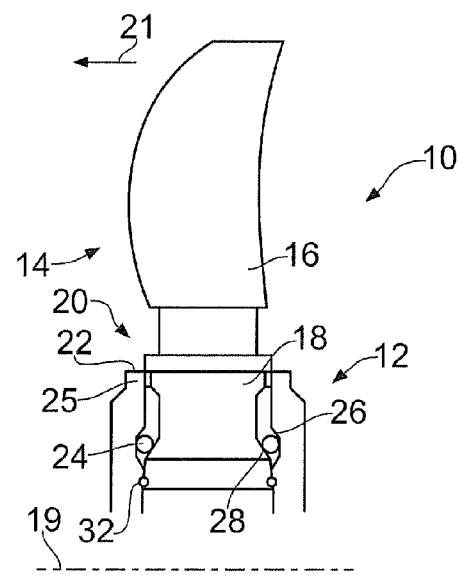
FIG. 1 shows a known propeller arrangement.
Figure 2:
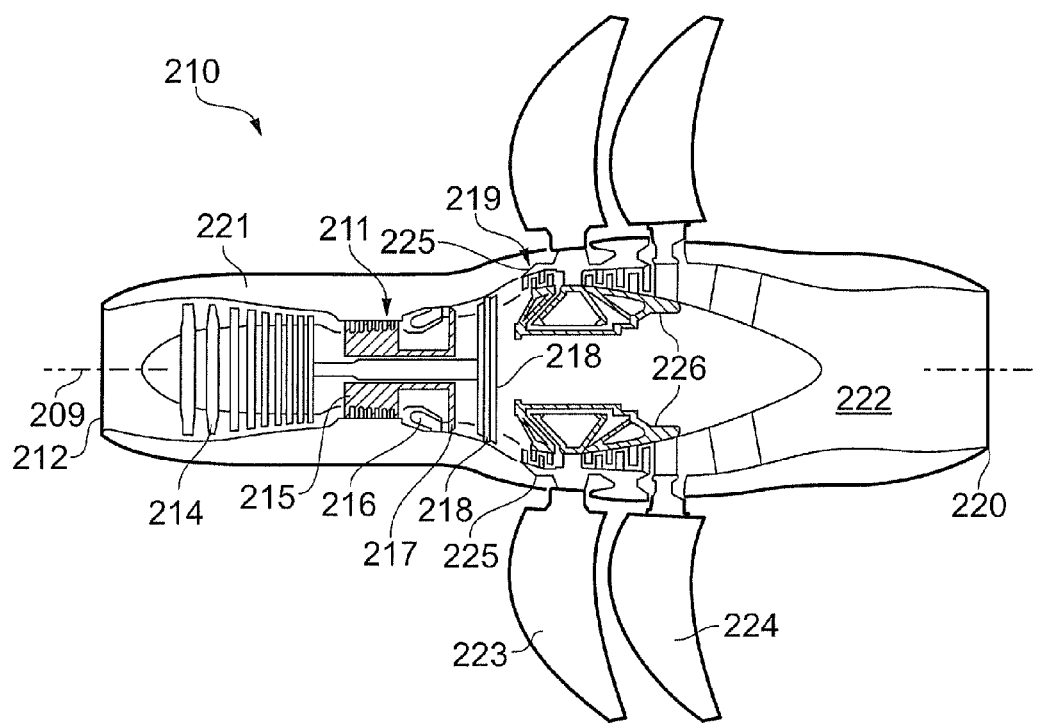
FIG. 2 shows a propeller gas turbine engine.

FIG. 2 shows a twin-spooled, contra-rotating propeller gas turbine engine 210 having a principal and rotational axis 209. The engine 210 comprises a core engine 211 having, in axial flow series, an air intake 212, a low pressure compressor 214 (LPC), a high-pressure compressor 215 (HPC), combustion equipment 216, a high-pressure turbine 217 (HPT), low pressure turbine 218 (LPT), a free power turbine 219 (FPT) and a core exhaust nozzle 220. A nacelle 221 generally surrounds the core engine 211 and defines the intake 212 and nozzle 220 and a core exhaust duct 222. The engine 210 also comprises two contra-rotating propellers 223, 224 attached to and driven by the free power turbine 219, which comprises contra-rotating blade arrays 225, 226.

The gas turbine engine 210 works in a conventional manner so that air entering the intake 212 is accelerated and compressed by the LPC 214 and directed into the HPC 215 where further compression takes place. The compressed air exhausted from the HPC 215 is directed into the combustion equipment 216 where it is mixed with fuel and the mixture combusted. The resultant hot combustion products then expand through, and drive the high, low-pressure and free power turbines 217, 218, 219 before being exhausted through the nozzle 220 to provide some propulsive thrust. The high, low-pressure and free power turbines 217, 218, 219 respectively drive the high and low pressure compressors 215, 214 and the propellers 223, 224 by suitable interconnecting shafts.

Figure 3:
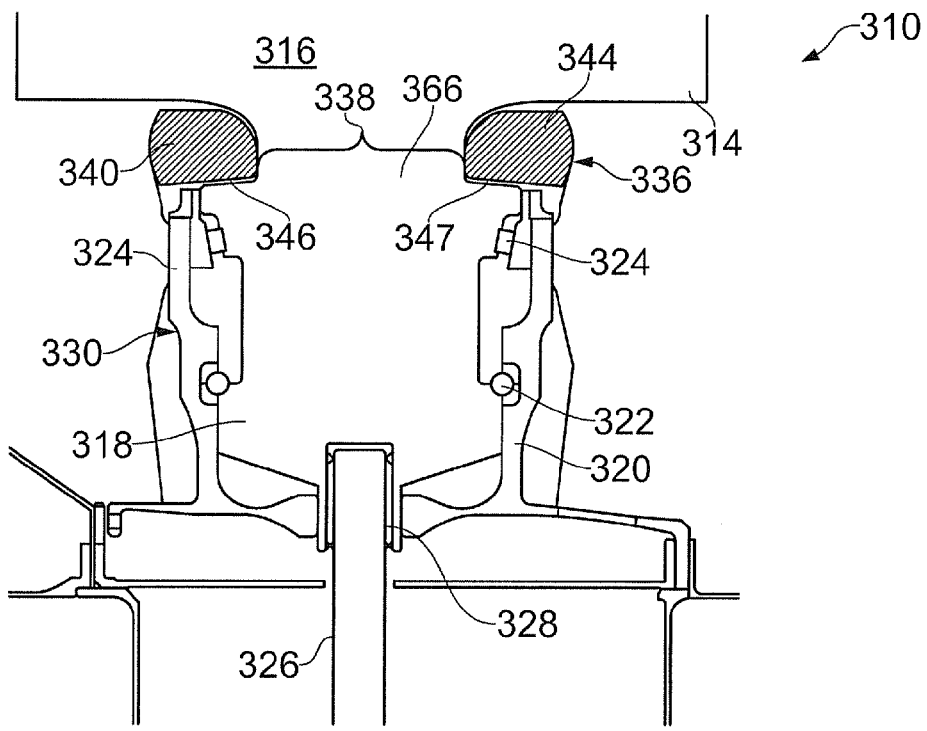
FIG. 3 shows a blade assembly according to the present invention.

FIG. 3 shows a blade 316 (the radial outer portion of which is not shown) of the propeller assembly 310 of the invention. A blade root 318 of the blade 316 is received in a support cup 320, which forms part of the hub, where it is supported for rotation about the longitudinal axis 317 of the blade 316 by bearings 322, 324. A typical bearing arrangement is shown but other bearing arrangements are feasible. A pitch control shaft 326 extends across a void within a shroud 328 which is radially inwards of the blade root 318. The shaft is connected to and transfers rotation from a pitch control mechanism (not shown) to the blade 316.

Each support cup 320 comprises a side wall 334 which is circular in cross-section. The interior surface of the side wall 334 is profiled in order to accommodate the bearings 322, 324, and the geometry of the side wall 334 is otherwise configured in order to provide adequate rigidity to support the blade 316 in a stable manner.

The support cup 320 is one of a plurality of such cups, one for each blade 316, provided in a support hub 330. It will be appreciated that the support cups 320 are disposed in a circumferential array about the support hub 330 and are interconnected by suitable webs or bridging structures. The support hub 330 is coaxial with the principal 209 axis of the engine.

In use, the support hub 330 and support cups 320 are rotationally driven about the principal axis 209 of the engine which results in a centrifugal force on the blade 316 and blade root 318 and hub 330. A primary retention device in the form of bearings 322 are arranged in corresponding opposing recesses in the blade root 318 and hub and act so as to prevent significant radial movement of the blade 316 relative to the support cup 320.

A secondary retention device in the form of an annular catcher 336 is provided radially outwardly of the blade root 318. The annular catcher 336 is in the form of a collar which includes a restriction 338 through which the blade root 318 cannot radially pass once assembled. Hence, if the primary retention fails during use, for example due to a failure of the bearings 322 or support cup or ring, the blade 316 is retained as part of the engine 210.

Figure 4:
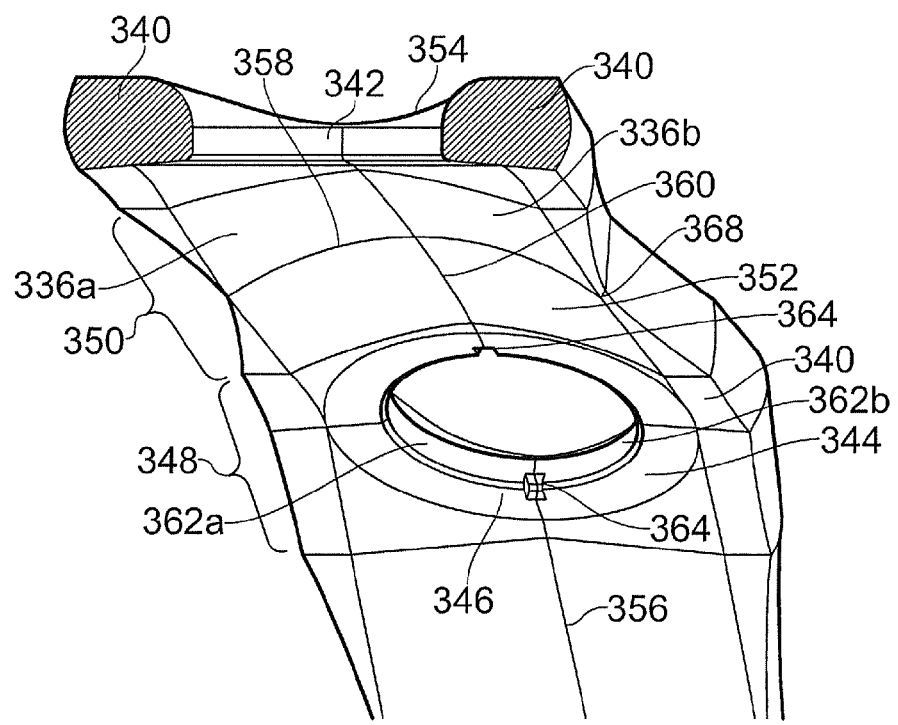
FIG. 4 shows the annular catcher of the assembly shown in FIG. 3.

As shown in FIGS. 3 and 4, the annular catcher 336 is in the form of a polygonal ring being generally constructed from two axially separated annular side rails 340 which are joined with an integral intermediate portion or web 342; the arrangement providing the annular catcher 336 with an axially extending banded ring like structure which is coaxial with the principal axis 209 of the engine 210. The intermediate portion 342 connects the side rails 340 so as to provide the necessary strength required to retain the blade root 316 when needed.

The restriction 338 in the annular catcher 336 which acts to retain the blade root 316 in the event of a failure of the primary retention device is in the form of an axi-symmetric aperture which is coaxially arranged with the longitudinal axis of the support cup 320 and pitch control shaft 326. In the described embodiment, the axi-symmetric aperture is circular having a circumferential side wall 344 or rail which is located in between the side walls and which provides a radially inner catcher surface 346. The catcher surface 346 is spaced apart from and opposes the blade root 316 when the primary retention device is operational. The cross-section of the aperture side wall 344 tapers such that the sidewall 344 thickness increases from the inner most circumferential edge, thereby providing the catcher surface 346 with a sloped or slightly conical profile. The aperture side wall 344 or rail is continuous so as to provide a closed circular structure.

The blade root 318 includes a blade catcher surface 347 which corresponds to the catcher surface 346 of the restriction 338 such that, when placed in contact under a significant centrifugal load, the blade will tend to centralise within the restriction 338 thereby distributing the load across the catcher surface 346 more evenly.

The annular catcher 336 includes a plurality of such restrictions circumferentially arranged around the support hub to coincide with each support cup and blade.

As shown in FIG. 4, the annular catcher 336 has a generally polygonal construction made up from sections of curved 348 and angled 350 sections. The curved sections 348 form the apexes of the polygon at intervals which coincide with the restrictions 338. The angled sections 350 are in the form of bridging portions which extend between the curved sections 348 of the annular catcher 326 and have a plurality of facets 352 which give the bridging portions a pinched or waisted appearance which narrows the axial length of the catcher 336 (with respect to the principal axis of the engine) at the midpoint 358 between each restriction 338.

The axially separated annular side rails 340 are defined by radially thicker portions or bands located at the axial extremities of catcher 336. The radial thickness of the side rails is substantially constant around the circumference of the catcher 336, but the axial length is reduced along the bridging portions to provide the waisted appearance described in the previous paragraph.

The radially inner 352 and outer 354 surfaces of the intermediate portions are both concave in appearance such that the thickness of the material at the circumferential midline 356 of the catcher 336 is generally less than the side rails 340. The extent of the concavity changes around the circumference of the catcher so as to provide the thinnest portion at the midpoint 358 between the restrictions. It will be noted that the edges of the catcher are chamfered 368 to help reduce crack propagation.

The annular catcher 336 is constructed from two annular segments 336*a*, 336*b* which are mated along a parting line. The annular segments 336*a*, 336*b* are mirror images of each other about a central plane which dissects the annular catcher such that the parting line 360 is coincident with the midline 356. Thus, each ring segment 336*a*, 336*b* includes semi-circular recesses 362*a*, 362*b* in the parting line 360 surface which correspond to opposing recesses in the other of the ring segments 336*a*, 336*b* which form the restrictions when in place. The ring segments 336*a*, 336*b* are fastened together with releasable fasteners in the form of nuts and bolts (not shown). However, it will be appreciated that other mechanisms will be suitable.

In the unlikely event that the fasteners fail during normal operation, the two annular segments would each retain hoop integrity but may move axially, thereby losing cross key engagement and becoming eccentric. This should give sufficient out-of-balance and allow the engine to be shut down. The bolted interface may also arrest the propagation of an axial crack in half of the annular catcher 336.

Although the bridging portions are shown as being continuous, some applications will allow for weight reduction features, such as apertures or voids, to be introduced without detracting from the hoop strength provided by the side rails 340.

The annular catcher 336 is positioned relative to the support cup 320 and blade root 316 such that the restriction 338 is separated or spaced from the blade root 318 in normal use. This spacing or separation means that there is no substantial radial load transferred directly from the blade root 318 to the catcher surface 346 during normal use. Thus, in the described embodiment, the only radial load experienced by the catcher 336 is created by its own mass when rotated. A further advantage of the spacing is that, in the event of a failure of the primary retention, the blade 316 experiences some radial movement which leads to an out of balance condition and detectable vibration. Thus the failure can be readily detected.

The radial spacing is achieved with a locating assembly in the form of a plurality of two part couplers in the form of cross key locators. Thus, as shown in FIG. 4, the catcher 336 includes a plurality of notches 364 in the radially inner peripheral surface of the restriction 338 which correspond to a plurality of lugs located on the support hub 330. There need to be a minimum of three fixings distributed around the circumference of the catcher 338 to provide the necessary centring. As will be noted, the described arrangement includes pairs of locating features, each one of a pair being placed on either side of the restriction 338. Similar locators may be placed by each restriction around the hub 330.

To form the propeller assembly 310, the blade root 318 is inserted into the support cup 320 and the bearings 322 inserted after any necessary alignment etc. Once the blade root 316 is in place, the annular segments 336a, 336b are positioned around the blade shaft 366 which connects the root 318 and aerofoil portion 314 and bolted together.

Having a bolted construction of this type is advantageous as it allows the blade 316 to be inserted into the support cup 320 prior to the annular segments 336a, 336b being bolted around the blade shaft 366 of the blade root 316 thereby forming a retention device having a continuous wall which encircles the blade root 316.

Other segmented constructions are envisaged as being possible. For example, instead of having two annular segments which abut one another along a single parting line which passes through all of the apertures, there may be multiple segments, each closing one or more apertures. Further, the parting line may not pass along the circumferential midline.

Figure 5:
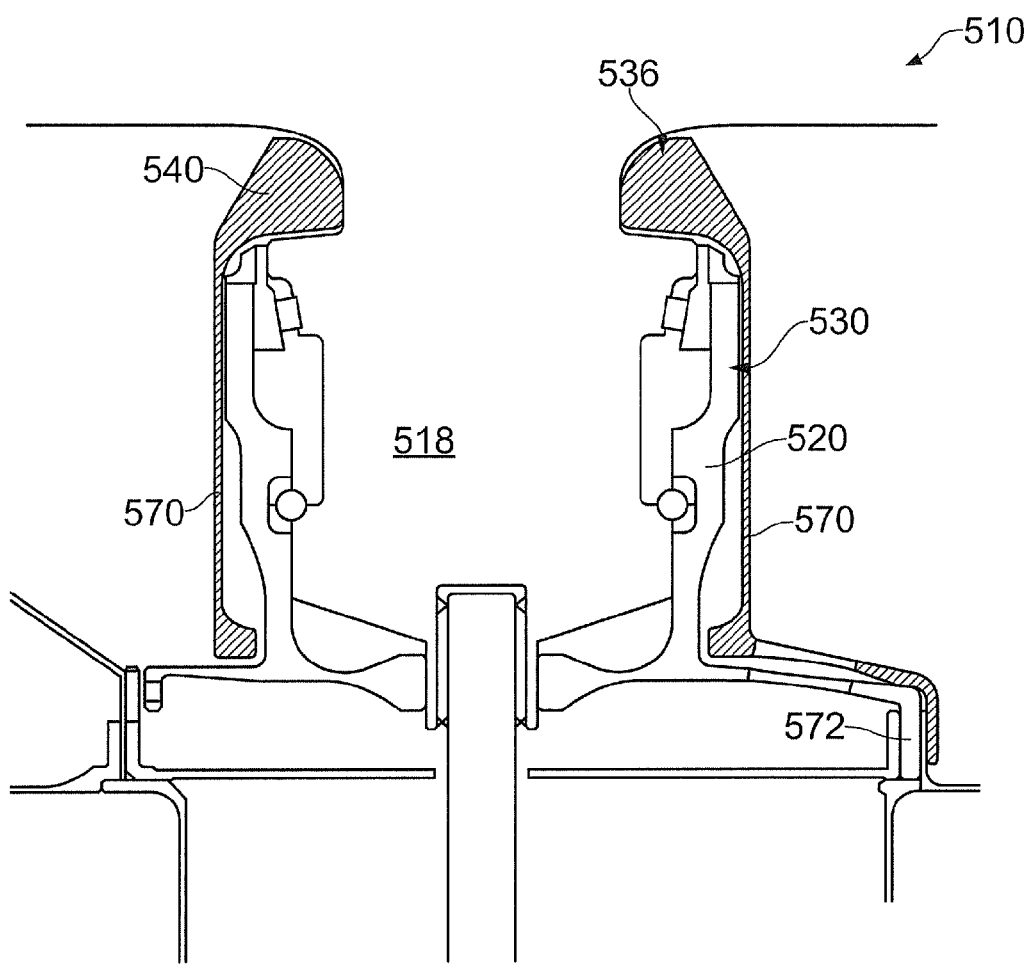
FIG. 5 shows an alternative blade assembly.

FIG. 5 shows an alternative arrangement of the propeller assembly 510 in cross section. Thus, there is an annular catcher 536 which is supported by flanges 570 which extend radially inward from the side rails 540 so as to partially envelope the support cup 520 and hub 330, thereby providing a nested arrangement. The flanges are continuous annular structures and are substantially planar such that the side rails 540 do not have a waisted appearance as per the previous embodiment. The catcher shown in FIG. 5 is bolted to a portion of the rotor in the form of the aft drive flange 572 which also connects to the support hub 530 so as to rotate the support cups 520 and thus blades 516. However, the locating assembly of the previous embodiment may be implemented instead of or as well as the flanged arrangement.

This nested configuration is particularly advantageous in that the catcher 536 provides a more complete containment function in the event of a mechanical breakdown of the blade root 516 or support cup 520 or hub 530. Further, such an arrangement is significantly more rigid.

For the avoidance of doubt, the above described embodiments are examples of the broader inventive concept as defined by the scope of the following claims.

The invention claimed is:

1. A blade assembly comprising:
   a hub which is rotatable about an axis;
   at least one blade having an aerofoil portion and a root, wherein the root is coupled to the hub using a primary retention device which prevents radial separation of the root and the hub in normal use; and
   a secondary retention device which comprises an annular catcher having a restriction aperture through which the root cannot radially pass, the restriction aperture being located radially outwardly and radially spaced from the root during use, wherein
   the annular catcher comprises at least two sections that abut one another along a parting line, the parting line passing through the restriction aperture,
   the at least two sections are annular rings defining the restriction aperture and at least one additional restriction aperture, and
   the parting line passes through each of the at least one additional restriction aperture.

2. The blade assembly as claimed in claim 1, wherein a portion of the blade passes through the restriction aperture, in use.

3. The blade assembly as claimed in claim 2, wherein the restriction aperture is axi-symmetric.

4. The blade assembly as claimed in claim 1, wherein the parting line lies on a circumferential midline of the annular catcher.

5. The blade assembly as claimed in claim 1, wherein the at least two sections of the annular catcher are attached to one another via a plurality of fasteners.

6. The blade assembly as claimed in claim 1, wherein the annular catcher is radially located around the hub by three or more locating assemblies.

7. The blade assembly as claimed in claim 6, wherein the locating assemblies include at least one two part connector having male and female portions.

8. The blade assembly as claimed in claim 7, wherein at least one part of the locator assemblies is local to the restriction aperture.

9. The blade assembly as claimed in claim 1, wherein the hub is nested within at least a portion of the annular catcher.

10. The blade assembly as claimed in claim 1, wherein the annular catcher is fixedly attached to the hub via a flanged portion.

11. The blade assembly as claimed in claim 1, wherein the annular catcher is generally polygonal.

12. The blade assembly as claimed in claim 1, wherein the annular catcher includes two side rails which are axially spaced relative the axis.

13. The blade assembly as claimed in claim 12, further comprising a web portion which extends between side rails.

* * * * *